May 16, 1967  G. DI DRUSCO ET AL  3,320,220
PROCESS FOR SEPARATING ELASTOMERIC HOMOPOLYMERS AND
COPOLYMERS FROM SOLUTIONS THEREOF
Filed March 20, 1964
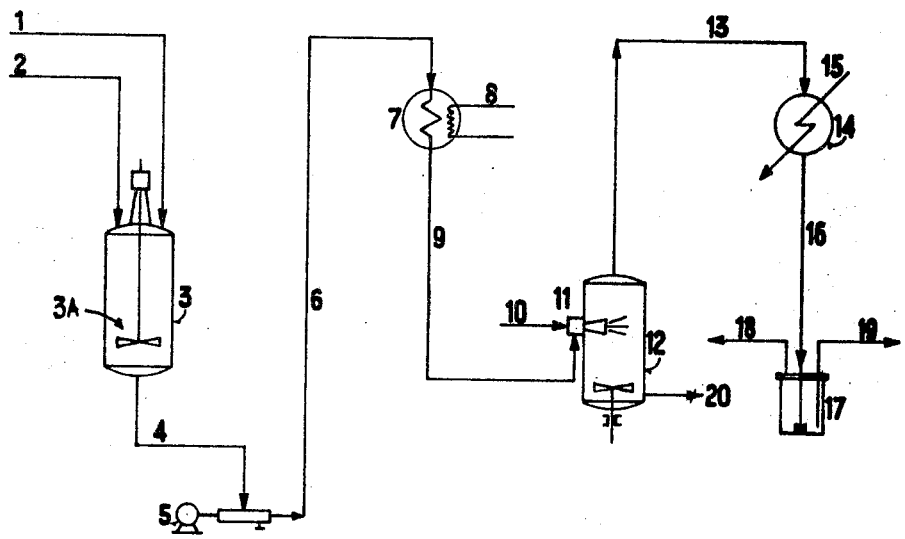
INVENTORS
GIOVANNI DI DRUSCO AND ARTURO COLAMUSSI
BY Patricia O. Peake
ATTORNEY United States Patent Office 3,320,220
Patented May 16, 1967

3,320,220
PROCESS FOR SEPARATING ELASTOMERIC HOMOPOLYMERS AND COPOLYMERS FROM SOLUTIONS THEREOF
Giovanni Di Drusco, Bologna, and Arturo Colamussi, Ferrara, Italy, assignors to Montecatini Edison S.p.A., Milan, Italy
Filed Mar. 20, 1964, Ser. No. 353,392
Claims priority, application Italy, Mar. 21, 1963, 5,764/63
4 Claims. (Cl. 260—80.5)

This invention relates to an improved process for separating olefin homopolymers and copolymers, more particularly elastomeric olefin homopolymers and copolymers, from solutions thereof in relatively non-volatile solvents and/or in unreacted liquid monomer or mixed monomers.

As is known, synthetic elastomers having very desirable characteristics can be obtained by polymerizing dienes, or by copolymerizing ethylene in admixture with higher alpha-olefins and, optionally, a third monomer containing two or more double bonds, in contact with particular catalyst systems.

The polymerization and copolymerization processes are carried out, generally, in a solvent which is inert under the polymerization conditions, and in which the elastomeric polymers and copolymers are dissolved as they are formed.

In other processes for producing the homopolymers and copolymers, an extraneous solvent is omitted, and one or more of the monomers, in the liquid phase, serves as the liquid polymerization diluent or medium which is a solvent for the homopolymer or copolymer.

In the production of elastomeric terpolymers of ethylene, a higher alpha-olefin, and a non-conjugated diolefin, for instance, the polymerization reaction mass usually comprises, in addition to the extraneous solvent, if such is used, an excess of unreacted diolefin in which the terpolymer is partially or completely dissolved.

In such processes, the problem exists of effectively and economically separating the elastomeric polymer from the solvent and/or from the excess of the unreacted diolefin in which it is dissolved.

Even when the solvent is relatively volatile, the problem is complicated by the elastomeric nature of the polymers or copolymers which tend to agglomerate into viscous masses as the solution is concentrated by distillation or by evaporation of the solvent in the air. The solvent trapped in the viscous masses can diffuse outwardly from the mass only with difficulty, resulting in an incomplete elimination of the solvent. In addition, the homopolymers and copolymers which occur in the form of agglomerates or viscuos masses are very difficult to process in subsequent treatments, such as mixing thereof with vulcanizing aids.

If the volatile substances are not removed, or substantially removed, from the elastomeric polymers and copolymers before the latter are subjected to various aftertreatments, the elimination of the residual volatile substances during the subsequent processing can involve the danger of explosion due to the formation of explosive mixtures of air and the residual volatile substances released during the after-processing.

It has been proposed, therefore, to separate the elastomeric homopolymers and copolymers from the volatiles (including unreacted monomers) present in the solutions leaving the polymerization zone by injecting the solution into warm water and stripping it with steam which supplies heat for evaporating the solvent, the objective being to precipitate the elastomeric polymer or copolymer in the form of dispersed granules while simultaneously removing the solvent and/or unreacted monomer in the current of steam.

It has also been proposed to spray the solution, together with superheated steam, through suitably shaped nozzles which atomize the solution and assure a wide exchange surface with the vapor used for facilitating evaporation of the solvent.

Those methods can be satisfactory for the elimination of monomers having a low boiling point and of relatively highly volatile solvents, such as paraffinic hydrocarbons containing 3 or 4 carbon atoms, hexane, heptane, benzene, etc.

Even in those instances, however, precautions are required to prevent the agglomeration of the precipitated particles of the elastomeric polymers or copolymers, in order to avoid the formation of polymer films on the wall in front of the nozzle, etc.

When the solvent and/or unreacted monomer associated with the polymer or copolymer is relatively non-volatile (boiling points higher than about 150° C.), a good dispersion of the elastomeric polymer or copolymer in the form of granules can be obtained by the methods mentioned, but it is not possible to eliminate the solvent or unreacted monomer to the required extent. In order to obtain a satisfactory separation of the polymer or copolymer from the solvent and/or unreacted monomer, large amounts of superheated steam have to be used, and consequently those methods are prohibitively costly.

One object of this invention is to provide an improved method for eliminating the solvent and/or unreacted liquid monomer from the polymerization reaction mass comprising the elastomeric polymer or copolymer dissolved in the solvent and/or residual monomer.

This and other objects are accomplished by the present invention in accordance with which the polymerization reaction solution is first converted to an aqueous emulsion, and the emulsion, after heating thereof, is sprayed through suitable nozzles simultaneously with superheated steam. Preferably, the emulsion is sprayed into warm water which is agitated continuously.

The present method results in practically complete removal of the solvent and/or residual monomer; the content of residual solvent and/or monomer in the final elastomeric polymer or copolymer is less than 0.5%.

An additional advantage of the present process is that the amount of superheated steam required in carrying it out is substantially lower than is required in the prior art processes discussed hereinabove.

In the present process, the composition fed to the spraying nozzles is a true emulsion in which the elastomeric polymer or copolymer is in solution in the solvent and/or unreacted liquid monomer. This is different from those processes of the prior art in which cold water is mixed with the polymer or copolymer solution before it is sprayed, together with steam, into a stripping zone, in order to precipitate the polymer or copolymer while the mixture of solvent and/or liquid unreacted monomer remains in the liquid state. In these processes, the composition fed to the spraying nozzles is actually a dispersion of polymer or copolymer particles in the mixture of water and solvent.

The emulsion fed to the spraying nozzles in the present process may comprise water in varying amounts, from a minimum of 20% up to a maximum at which the process is still economical for commercial use, generally up to about 80% by weight.

Less superheated steam is consumed in carrying out the process of this invention because the homopolymer or copolymer particles precipitated from the aqueous emulsions are much finer than the particles comprised in the pre-formed dispersion fed to the spray nozzles in the prior art process, and consequently the solvent residuels occluded in the fine particles evaporate more readily.

The fine particles of the elastomeric homopolymers or copolymers which are precipitated from the emulsion by spraying the latter into the zone containing water do not tend to agglomerate and, therefore, filtration of the aqueous dispersion obtained is facilitated and can be effected easily.

In carrying out the present process, the aqueous emulsion is heated to a temperature higher than 100° C. before it is fed to the spray nozzle. Preferably, the emulsion is heated to 120° C. to 160° C., before being sent to the nozzle.

In the accompanying drawing, the single figure represents a schematic representation of apparatus suitable for use in carrying out the process of this invention.

In the drawing, 3 is a vessel provided with an agitator 3a and into which the solution of the elastomeric homopolymer or copolymer is fed through line 1. Water containing a small amount of an emulsifying agent is fed into vessel 3 through line 2.

The emulsion formed in vessel 3 is withdrawn at the bottom thereof, through lines 4 and 6, by means of metering pump 5, and is forwarded to a heat exchanger 7 supplied with heating fluid, usually steam, through line 8. After being heated to the desired temperature by the heat released by the heating fluid, the emulsion is forwarded to the spraying nozzle 11, through line 9 under pressure. Steam is fed to the nozzle simultaneously, through line 10.

The nozzle is supported in a stripper 12 containing vigorously agitated warm water (formed by condensation of a portion of steam and being therefore at a temperature of about 100° C. depending on the pressure) into which the finely pulverized emulsion leaving the spray nozzle is projected. The polymer or copolymer particles precipitate and are finely dispersed in the water, insuring easy and rapid elimination of the solvent. The aqueous dispersion of the polymer or copolymer is withdrawn from the stripper through line 20, and is forwarded to a stage in which it is filtered, and the recovered particulate polymer or copolymer is dried.

The vapors leaving the stripper pass through line 13 to the reflux condenser 14, in which they are condensed. From the condenser the condensate passes continuously through line 16 to a separator 17 in which the organic and aqueous phases are separated continuously, the organic phase being withdrawn through line 18, and the aqueous phase being withdrawn through line 19.

The process of this invention can be used advantageously in separating any elastomeric synthetic polymer or copolymer from a solution thereof in the polymerization solvent and/or in residual unreacted monomer or monomers, including butyl rubber (copolymer of isobutene and isoprene), polyisoprene, polybutadiene cis-1,4, atactic polypropylene, etc.

The process is particularly useful for eliminating solvent and/or liquid unreacted monomer from amorphous, elastomeric copolymers of ethylene and a higher alpha-olefin, more particularly propylene or butene-1, and from elastomeric terpolymers of ethylene, propylene and a non-conjugated diolefin.

Such elastomeric copolymers and terpolymers can be obtained by polymerizing a mixture of the comonomers, in suitable molar ratios, in contact with catalysts prepared from hydrocarbon-soluble vanadium compounds and alkyl aluminum compounds, e.g., aluminum trialkyls or dialkyl aluminum halides.

The following examples are given to illustrate the invention and are not intended to be limitative.

*Example 1*

Using apparatus as shown in the drawing, a 10% n-decane solution of an amorphous, elastomeric ethylene-propylene copolymer (prepared e.g. according to U.S. patent application Ser. No. 779,249 filed on Dec. 9, 1958, by copolymerizing the monomers in n-decane and in contact with a catalyst obtained by mixing aluminum triisobutyl with vanadium tetrachloride to obtain an amorphous, elastomeric copolymer containing 50% by mols of ethylene and having a Mooney viscosity of 30[ML(1+4) at 100° C.]) is fed into vessel 3 provided with the agitator 3a. Water containing about 0.1% of the emulsifying agent "Aerosol OT" (sodium 2-ethylhexylsulfosuccinate) is also fed into vessel 3, through line 2. An aqueous emulsion containing 50% of the copolymer solution is formed in vessel 3.

The emulsion withdrawn from the bottom of vessel 3 is forwarded through lines 4 and 6 by means of the metering pump 5, to the heat exchanger 7 in which it is heated to a temperature of about 150° C. by steam introduced through line 8. It is then fed, through line 9, and under a pressure of 10 atm., into the spray nozzle 11 simultaneously with steam under a pressure of 18 atm. which is fed into the nozzle 11 through line 10. The nozzle is supported in stripper 12 containing warm water which is agitated continuously. As the finely atomized emulsion leaving the spray nozzle is projected into the continuously agitated body of warm water in stripper 12, the elastomeric ethylene/propylene copolymer particles precipitate and are finely dispersed in the warm water, thus allowing easy and rapid elimination of the solvent from the copolymer particles.

The temperature in the stripper is stabilized at 99° C. under an absolute pressure of 775 mm. Hg (torr).

The aqueous dispersion of the copolymer withdrawn from stripper 12 is sent through line 20 to the filtration and drying stage.

The copolymer leaving stripper 12 has an n-decane content of only 0.3%.

In the above-described process the total amount of steam used, including the steam used for heating the emulsion in heat exchanger 7, was only 7 kg. of steam at 18 atm. per 1.0 kg. of starting copolymer solution.

The steam requirements are very much higher if the emulsification with water is omitted, when the same amount of surface active agent is added to the copolymer solution before forwarding it directly to the spray nozzle 11, after heating it to 150° C. under a pressure of 10 atm. in the heat exchanger 7. In that case, while it can be calculated theoretically that 1.28 kg. of steam are required for evaporating 1.0 kg. of n-decane from the solution and for reducing the partial vapor pressure of n-decane, in actual practice it has been found that in order to reduce the n-decane content of the copolymer leaving the stripper to 0.3%, 15 kg. of steam at 18 atm. are required, and the thermal yield is extremely low.

*Example 2*

A 10% solution of an elastomeric terpolymer of ethylene, propylene and cyclooctadiene-1,5 in liquid monomeric cyclooctadiene-1,5 (obtained, e.g. according to Belgian Patent No. 623,698, published Feb. 14, 1963, by terpolymerizing a mixture of the monomers in the absence of extraneous solvents but using an excess of the diolefin in the liquid state, in contact with a catalyst obtained by mixing an alkyl aluminum halide with a hydrocarbon-soluble vanadium compound) is first expanded to remove unreacted gaseous ethylene and propylene, and then treated to remove the liquid cyclooctadiene-1,5, using apparatus as shown in the drawing.

The solution is mixed in vessel 3 with water containing 0.1% of "Aerosol OT," to obtain an emulsion containing 50% of the terpolymer solution. It is then heated at 150° C. and fed to the spray nozzle 11, simultaneously with steam at 18 atm., in order to separate the terpolymer and recover the unreacted cyclooctadiene-1,5.

The temperature inside the stripper 12 is stabilized at about 98° C. under an absolute pressure of 775 mm. Hg.

The terpolymer leaving the stripper has a cyclooctadiene-1,5 content of only 0.3%.

The total steam consumption is 3 kg. per 1.0 kg. of the starting solution treated, compared to a steam consumption of 7 kg. per 1.0 kg. of solution required when the emulsification with water is omitted and the same amount of surface active agent is added to the starting solution before heating and spraying thereof.

*Example 3*

A 10% solution of cis-1,4 polybutadiene in a commercial mixture of m- and p-xylenes (obtained by polymerizing butadiene-1,3 according to U.S. patent application Ser. No. 791,456 filed on Feb. 5, 1959, in the xylenes, in contact with a catalyst prepared from $CoCl_2$ and diethyl aluminum monochloride, and having a Mooney viscosity [ML (1+4) at 100° C.] of 35) is treated to remove the solvent, using apparatus as shown in the drawing, and conditions as described in Example 1.

The polymer leaving the stripper 12 has a xylene content of only 0.3%.

The total steam consumption is 0.9 kg. (at 18 atm.) per 1.0 kg. of solution, as compared to a steam consumption of 3 kg. per 1.0 kg. of starting solution when the emulsification with water is omitted.

Any surface active agent can be used in preparing the aqueous emulsion of the solution of the elastomeric homopolymer or copolymer in the extraneous polymerization solvent and/or unreacted liquid monomer or mixture of monomers. The amount of emulsifying agent used can vary.

Amounts of from 0.01% to 0.3% by weight based on the weight of the solvent are satisfactory.

The essential distinguishing features of this invention are the emulsification of the solution of the elastomeric homopolymer or copolymer with water and heating of the aqueous emulsion to a temperature above 100° C., before feeding the solution to the spray nozzle, so that the composition which is fed to the nozzle is a true aqueous emulsion in which the elastomeric homopolymer or copolymer is in the dissolved state in the solvent or unreacted liquid monomer. Those features of the invention are distinguishing and critical, since they are responsible for the extremely finely divided state of the elastomeric homopolymer or copolymer precipitated in the water in the stripper, as the solvent and/or liquid monomer evaporates, which finely divided state permits of easy elimination of residual solvent and or monomer from the particles and thus, indirectly, is also responsible for the fact that the homopolymer or copolymer particles do not tend to agglomerate or form viscous masses.

As will be apparent, various modifications can be made in carrying out the process, in adapting it to the treatment of solutions of different synthetic elastomeric homopolymers or copolymers, in different extraneous solvents and/or different unreacted liquid monomers. All such modifications can be made without departing from the essential features of the invention and, therefore, are intended to be included in the appended claims.

We claim:

1. A process for separating elastomers selected from the group consisting of elastomeric olefin homopolymers and elastomeric olefin copolymers from solutions thereof, which comprises emulsifying the solution with from about 20% to about 80% by weight of the resulting emulsion of water, heating the aqueous emulsion to a temperature of at least about 100° C., and spraying the heated aqueous emulsion, together with superheated steam, into a body of continuously agitated warm water to evaporate the solvent and precipitate the polymer in the form of fine particles which are dispersed in the water.

2. The process of claim 1 wherein the solution emulsified with water is a solution of an amorphous, elastomeric copolymer of ethylene and propylene.

3. The process of claim 1 wherein the solution emulsified with water is a solution of an elastomeric terpolymer of ethylene, propylene and cyclooctadiene-1,5.

4. The process of claim 1 wherein the solution emulsified with water is a solution of cis-1,4-polybutadiene.

References Cited by the Examiner

UNITED STATES PATENTS 2,953,556  9/1960  Wolfe et al. _____ 260—29.7

FOREIGN PATENTS 478,058  10/1951  Canada.

MURRAY TILLMAN, *Primary Examiner.*

J. ZIEGLER, *Assistant Examiner.*